United States Patent Office 3,345,128
Patented Oct. 3, 1967

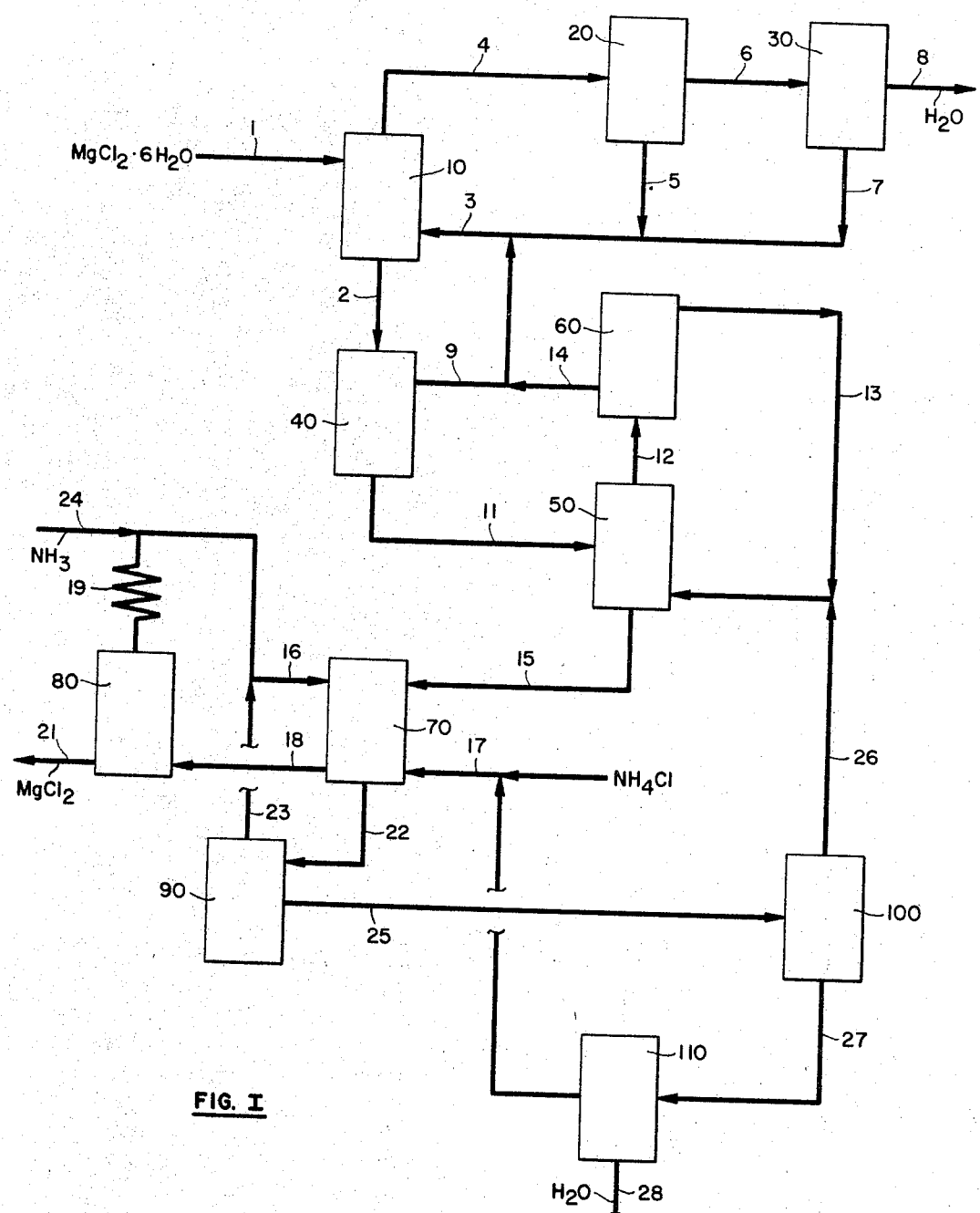
FIG. I
INVENTOR
EUGENE RICHARD NIGHTINGALE, JR.

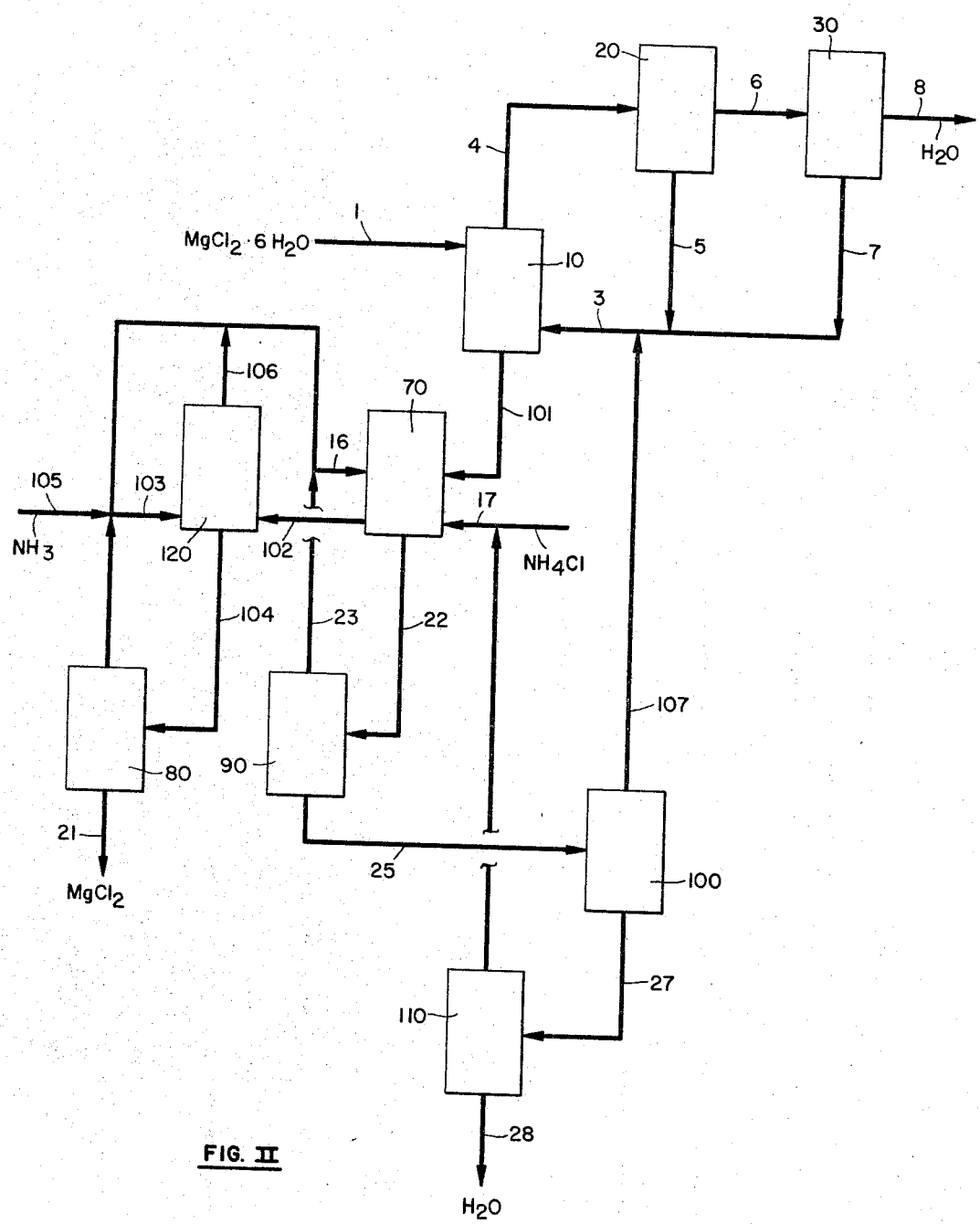
FIG. II

3,345,128
DEHYDRATION OF MAGNESIUM CHLORIDE
UTILIZING HEAVY HYDROCARBONS
Eugene Richard Nightingale, Jr., Murray Hill, N.J., assignor to Esso Research and Engineering Company, a corporation of Delaware
Filed Apr. 12, 1965, Ser. No. 447,491
8 Claims. (Cl. 23—91)

ABSTRACT OF THE DISCLOSURE

Magnesium chloride is dehydrated by countercurrently contacting solid particles with an upflowing, relatively high boiling liquid hydrocarbon. The liquid hydrocarbon and water are removed overhead, separated and the high boiling liquid hydrocarbon recycled. A slurry of high boiling liquid hydrocarbon and magnesium chloride partially dehydrated, is removed from the bottom of the dehydration zone. The major amount of the high boiling hydrocarbon may be removed in an initial separation zone. However, the final traces of the relatively high boiling hydrocarbons are removed from the partially dehydrated magnesium chloride by countercurrently contacting the slurry with a relatively low boiling hydrocarbon. A slurry of relatively low boiling hydrocarbon and magnesium chloride is removed and introduced into an initial reaction zone into which ammonia is introduced so as to form the magnesium chloride ammoniate. Ammonium and low boiling hydrocarbon is removed from the initial reaction zone, separated into ammonia and low boiling hydrocarbon streams and recycled to the system. The magnesium chloride ammoniate is passed to a secondary reaction zone maintained under conditions to produce gaseous ammonia and dehydrated magnesium chloride.

---

The present invention is broadly concerned with the purification and dehydration of magnesium chloride to produce anhydrous magnesium chloride which may be further processed as, for example, by means of an electrolytic cell. The invention is specifically directed toward a technique for the partial dehydration of magnesium chloride utilizing a liquid such as a liquid hydrocarbon. The invention is more specifically concerned with a technique for the dehydration of magnesium chloride utilizing a plurality of integrated processing zones wherein the last traces of water are removed by the use of ammonia. The magnesium chloride hexammoniate product produced is then processed in a manner to produce anhydrous magnesium chloride and to regenerate the ammonia for recycling to the system.

It is known in the art that naturally occurring magnesium chloride, ores or brines, generally contain associated therewith about six molecules of water of hydration ($MgCl.6H_2O$). It is also known in the art that by general dehydration processes it is possible to remove about four molecules of water without securing undesirable side reactions. However, if further dehydration is continued by known techniques in order to remove the remaining two molecules of water of hydration, undesirable side reactions occur such as the formation of magnesium hydroxy chloride, magnesium oxide and hydrochloric acid. This is very undesirable, particularly if the magnesium chloride is to be further processed by electrolysis.

As pointed out heretofore, one broad aspect of the present invention is concerned with the partial dehydration, for example, of $MgCl_2.6H_2O$ in a column of a liquid, particularly of a liquid hydrocarbon, to produce a product having less than about 4 molecules of hydration as, for example, to produce products, for example, $MgCl_2.3.9H_2O$ and $MgCl_2.2.0H_2O$. A preferred technique of the present invention is to further process the partially dehydrated magnesium chloride in the hydrocarbon slurry under conditions wherein the remaining water of hydration is replaced with ammonia. This latter product is further treated to recover the ammonia and to produce anhydrous magnesium chloride product which may be further processed as, for example, in an electrolytic cell.

The present invention may be more fully understood by reference to the drawings illustrating preferred embodiments of the same. FIGURE 1 illustrates an integrated process wherein a light hydrocarbon washing solvent is utilized to remove the relatively high boiling hydrocarbon, while FIGURE 2 illustrates a process wherein the hydrocarbon slurry is introduced directly into the initial reaction zone, and wherein the hydrocarbon is removed with ammonia.

Referring specifically to FIGURE 1, a hydrated magnesium chloride product, ore or brine as, for example, $MgCl_2.6HO$, is introduced into the top area of initial dehydration zone 10 by means of line 1. Dehydration zone 10 is filled with an upflowing, relatively high boiling oil, preferably a hydrocarbon oil such as a paraffin, cycloparaffin, aromatic, and the like. The boiling range of the hydrocarbon oil should be from about 110° C. to about 500° C., preferably above about 250° C. The temperature of dehydration zone 10 is maintained in the range from about 105° C. to 300° C. as, for example, about 200° C. The initial boiling point of the hydrocarbon should be about 25° C. to 50° C. such as about 35° C. above the temperature maintained in zone 10.

As the magnesium chloride falls through the column of oil, it is partially dehydrated and is removed from the bottom of column 10 by means of line 2. This partially dehydrated product has less than about 4 molecules of water of hydration as, for example, about 2 molecules of water of hydration. The temperature in zone 10 may be maintained by any suitable means such as by heating the incoming hydrocarbon oil which is introduced by means of line 3.

Water vapor along with upflowing hydrocarbon oil is removed from the top of zone 10 by means of line 4 and passed into a separation zone 20 wherein a water layer and a hydrocarbon layer separate. The hydrocarbon layer, or phase, is removed from zone 20 by means of line 5 and preferably recycled to zone 10 after heating the same. The water phase is removed from zone 20 by means of line 6 and introduced into a separation zone 30 wherein the remaining hydrocarbon is separated from the water. The hydrocarbon is removed by means of line 7 and preferably recycled to zone 10 while the water is removed by means of line 8 and discarded. It is to be understood that the water vapor and hydrocarbon may be removed as separate streams from the upper area of zone 10. The water may be removed as steam, condensed and discarded while the hot hydrocarbon liquid may be passed to a separation zone where entrained moisture may be removed before recycling the same to the system.

Thus, one basic concept of the present invention is to utilize an upflowing hydrocarbon oil to partially dehydrate downflowing, solid particles of magnesium chloride and to produce a partially dehydrated magnesium chloride as a hydrocarbon slurry which is removed by means of line 2. Dehydration zone 10 may also be operated with internal stirring or stirrers in which the bottom of zone 10 contains a settling zone to concentrate the slurry. It is preferred to further process this slurry by passing the same to a separation or centrifuging zone 40. In this zone additional hydrocarbon is separated by means of line 9 and preferably recycles to zone 10 after heating the same.

A partially dehydrated magnesium chloride as, for example, MgCl₂·2H₂O, wet with the relatively heavy hydrocarbon oil is passed to light hydrocarbon washing zone 50 by means of line 11. In this zone the relatively heavy hydrocarbon oil is washed, preferably countercurrently, with a relatively light or low boiling hydrocarbon oil as, for example, hexane. Other low boiling hydrocarbons which may be used are, for example, butane, pentane, heptane, and the like. A mixture of light hydrocarbons may be used such as a fraction boiling in the range up to about 110° C. The temperature maintained in zone 50 is less than the boiling point of the light hydrocarbons, preferably in the range from about 0° C. to 150° C. such as about 100° C., while the pressure is about 1 atmosphere. The relatively heavy hydrocarbon oil together with, for example, hexane, is removed from zone 50 by means of line 12 and passed into a separation or distillation zone 60. Here temperature and pressure conditions are adjusted to remove overhead by means of line 13 the hexane which is condensed and recycled to washing zone 50. The relatively heavy hydrocarbon oil is removed from the bottom of zone 60 by means of line 14 and preferably recycled to zone 10.

The partially dehydrated magnesium chloride

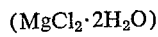
$$(MgCl_2 \cdot 2H_2O)$$

and the hexane, or equivalent light hydrocarbon slurry is removed from washing zone 50 by means of line 15 and introduced into an initial reaction zone 70. Liquid aqueous ammonia is introduced into zone 70 by means of line 16 under conditions to replace the remaining water of hydration with ammonia.

The hydrocarbon liquid concentration in initially reaction zone 70 is from about 1–40% by weight preferably about 20% by weight. The liquid aqueous ammonia concentration in zone 70 is in the range of about 40–95% by weight, preferably about 70% to 90% by weight such as about 75% by weight. Another preferred adaptation is to also introduce ammonium chloride into reaction zone 70 by means of line 17. The ammonium chloride concentration in reaction zone 70 is in the range of about 0.5 to 10% by weight, preferably about 2–5% by weight.

The temperature maintained in reaction zone 70 is in the range from about 15° to 95° C., preferably at a temperature of about 60° C. The pressure in reaction zone 70 is maintained in the range from about 100 to 800 lbs., preferably at a pressure of about 350 lbs. Under these conditions the water in the magnesium chloride is replaced to form magnesium chloride hexammoniate $$(Mg(NH_3)_6Cl_2)$$

The other products in zone 70 are ammonium chloride and water which are dissolved in the liquid ammonia and the liquid hydrocarbon.

The magnesium chloride hexammoniate

$$(Mg(NH_3)_6Cl_2)$$

is withdrawn from initial reaction zone 70 by means of line 18 and introduced into a decomplexing chamber or secondary reaction zone 80. The temperature and pressure conditions are adjusted in secondary reaction zone 80 to separate the ammonia which is removed overhead and condensed in condenser 19 and recycled to initial reaction zone 70 by means of line 16. Anhydrous magnesium chloride is removed from secondary reaction zone 80 by means of line 21 and further processed as desired as, for example, in an electrolytic cell. The temperature in secondary reaction zone 80 is maintained in the range from about 270° to 550° C., preferably about 400° C., while the pressure is in the range from 0.1 to 30 atmospheres, preferably about 1 to 25 atmospheres, such as about 20 atmospheres.

Liquid ammonia, containing dissolved therein water, ammonium chloride and the light hydrocarbon is withdrawn from reaction zone 70 by means of line 22 and passed into an ammonia recovery zone 90. Zone 90 is

maintained at a temperature in the range from about 25–95° C. preferably at about 60° C. The pressure in zone 90 is in the range from about 140 to 800 p.s.i.g., preferably about 300 p.s.i.g. Under these conditions ammonia is removed by means of line 23 which is recycled to reaction zone 70 after condensing. Makeup ammonia may be introduced into the system by means of line 24.

When using the preferred adaptation of the process by the addition of ammonium chloride, a liquid stream free of ammonia is removed from the zone 90 by means of line 25 and passed to hydrocarbon recovery zone 100. Temperature and pressure conditions in zone 100 are such as to remove the light hydrocarbon overhead by means of line 26. Generally the temperature conditions are in the range from about 25° to 95° C. such as about 45° C. while the pressure is in the range from about 0.1–4 atmospheres, preferably at about 1 atmosphere. Under these conditions the light hydrocarbon is removed by means of line 26 and condensed and recycled to washing zone 50.

The stream, free of hydrocarbons, containing water and ammonium chloride is withdrawn from zone 100 by means of line 27 and introduced into ammonium chloride recovery zone 110. Temperature and pressure conditions in zone 110 are adjusted to segregate ammonium chloride which is removed by means of line 17 and recycled to initial reaction zone 70. The water stream is removed from zone 110 by means of line 28 and discarded.

Referring specifically to FIGURE 2, a process is illustrated wherein the hydrocarbon slurry from dehydration zone 10 is introduced directly into initial reaction zone 70. Zones 20 and 30 will not be described as they operate and function as described with respect to FIGURE 1. Zones similar to those described in FIGURE 1 are similarly designated in FIGURE 2. Thus, the feed magnesium chloride is introduced into the upper end of zone 10 by means of line 1. Water and hydrocarbon are removed overhead by means of line 4 while the incoming hydrocarbon is introduced by means of line 3. The relation of heavy hydrocarbon used is similar to the hydrocarbon described with respect to FIGURE 1. The hydrocarbon slurry is withdrawn from dehydration zone 10 by means of line 101 and introduced into initial reaction zone 70 by means of line 16 under conditions to replace the remaining water of hydration with ammonia. The liquid ammonia concentration in zone 70 is in the range of about 40–95% by weight, preferably about 70% to 90% by weight, such as about 75% by weight. Another preferred adaptation is to also introduce ammonium chloride into reaction zone 70 by means of line 17. The concentration of the ammonium chloride in reaction zone 70 is in the range of about 0.5 to 10% by weight, preferably about 2–5% by weight.

The temperature maintained in reaction zone 70 is in the range from about 15° C. to 95° C., preferably at a temperature of about 60° C. The pressure in initial reaction zone 70 is maintained in the range from about 100 to 800 lbs., preferably at a pressure of about 350 lbs. Under these conditions the water in the magnesium chloride is replaced to form magnesium chloride hexammoniate (Mg(NH₃)₆Cl₂). The other products are ammonium chloride and water which are dissolved in the liquid ammonia and the liquid hydrocarbon.

The magnesium chloride hexammoniate

$$(Mg(NH_3)_6Cl_2)$$

is withdrawn from reaction zone 70 by means of line 102 and introduced into a wash chamber or zone 120. Liquid ammonia is introduced into zone 120 by means of line 103. The magnesium chloride hexammoniate is washed with this liquid ammonia in order to remove the final traces of hydrocarbon in the product. The magnesium chloride hexammoniate free of hydrocarbons and wet with ammonia is removed from zone 120 by means of line 104 and introduced into a secondary reaction zone or decomplexing zone 80. The temperature and pressure conditions in secondary reaction zone 80 are adapted to form ammonia which is removed by means of line 103 and preferably condensed and recycled to zones 70 and 120. Make-up ammonia is introduced by means of line 105. Anhydrous magnesium chloride is removed from secondary reaction zone 80 by means of line 21 and further processed as desired. The liquid ammonia containing traces of hydrocarbons is removed from zone 120 by means of line 106 and preferably recycled to zone 70.

Liquid ammonia containing dissolved therein water, ammonia chloride and the hydrocarbon, is withdrawn from initial reaction zone 70 by means of line 22 and passed into ammonia recovery zone 90. Zone 90 is maintained at a temperature in the range from about 25–95° C. preferably at about 60° C. The pressure in zone 90 is in the range from about 140–800 p.s.i., preferably about 300 p.s.i. Under these conditions, ammonia is separated and removed by means of line 23 which is condensed and recycled to reaction zone 70.

As described heretofore, when using the preferred adaptation by the addition of ammonium chloride, a liquid stream free of ammonia, is removed from zone 90 by means of line 25 and passed to hydrocarbon recovery zone 100. Temperature and pressure conditions in zone 100 are maintained to remove the hydrocarbon overhead by means of line 107. Generally, the temperature conditions are in the range from about 25–95° C. such as about 45° C. while the pressure is in the range from about 0.1–4 atmospheres, preferably at about 1 atmosphere. Under these conditions, the hydrocarbon is removed by means of line 107 condensed by suitable means and preferably recycled to zone 10 after heating to the desired temperature.

The stream, free of hydrocarbons, containing water and ammonium chloride, is withdrawn from zone 100 by means of line 27 and introduced into ammonium chloride recovery zone 110. Temperature and pressure conditions in zone 110 are adjusted to segregate ammonium chloride which is removed by means of line 17 and recycled to initial reaction zone 70. The water stream is removed from zone 110 by means of line 28 and discarded.

What is claimed is:

1. Process for the partial dehydration of magnesium chloride which comprises introducing a hydrated magnesium chloride solid material into the top area of a dehydration zone, introducing a relatively high boiling hot hydrocarbon liquid into the bottom of said dehydration zone and countercurrently contacting the downflowing hydrated magnesium chloride with upflowing, relatively high boiling, hot hydrocarbon liquid, maintaining the temperature in said dehydration zone below the initial boiling point of the upflowing hydrocarbon liquid, whereby partial dehydration of the magnesium chloride will occur, removing from the top of said dehydration zone the hydrocarbon liquid and water, separating the water from the high boiling hydrocarbon liquid and recycling the hot hydrocarbon liquid to said dehydration zone, removing a hydrocarbon slurry of partially dehydrated magnesium chloride from the bottom of said dehydration zone and separating the relatively high boiling hydrocarbon liquid therefrom.

2. Process as defined by claim 1 wherein said relatively high boiling hydrocarbon liquid is completely separated from said partially dehydrated magnesium chloride by countercurrently washing with a relatively low boiling hydrocarbon liquid in a separation zone.

3. Process as defined by claim 2 wherein said relatively high boiling hydrocarbon used in said dehydration zone boils in the range of about 110° to 500° C. and wherein temperature in said dehydration zone is maintained in the range from about 105° to about 300° C.

4. Process as defined by claim 2 in which said relatively low boiling hydrocarbon is chosen from a class consisting of paraffin, cycloparaffin or aromatic whose boiling point is in the range from about 0° C. to about 150° C.

5. Process as defined by claim 1 wherein said partially dehydrated magnesium chloride after treatment in said separation zone is introduced into an initial reaction zone wherein the same is contacted with ammonia under temperature and pressure conditions adapted to replace the remaining water of hydration with ammonia to form magnesium chloride hexammoniate, wherein said magnesium chloride hexammoniate is then passed to a secondary reaction zone to decomplex the magnesium chloride hexammoniate to form ammonia which is recycled to the system and anhydrous magnesium chloride.

6. Process as defined by claim 1 wherein said slurry is introduced into an initial reaction zone in which ammonia is contacted with the slurry under temperature and pressure conditions to replace the remaining water of hydration with ammonia to form magnesium chloride hexammoniate, withdrawing a hydrocarbon slurry of magnesium chloride hexammoniate from said initial reaction zone and passing the same to a washing zone, contacting said slurry in said washing zone with liquid ammonia under conditions to remove the hydrocarbon from the magnesium chloride hexammoniate, withdrawing ammonia and hydrocarbon from the washing zone, withdrawing magnesium chloride hexammoniate wetted with ammonia from said washing zone and passing the same to a secondary reaction zone, maintaining temperature and pressure conditions in said secondary reaction zone to separate ammonia which is recycled to the system and separating anhydrous magnesium chloride.

7. Process as defined by claim 6 wherein said ammonia and hydrocarbon withdrawn from said washing zone is recycled to said initial reaction zone.

8. Process as defined by claim 1 wherein said relatively high boiling hydrocarbon liquid is separated from the magnesium chloride in two stages wherein the majority of the hydrocarbon liquid is separated in a first stage by centrifuging and in a second stage by countercurrently washing with a solvent.

References Cited

UNITED STATES PATENTS

| | | | |
|---|---|---|---|
| 1,557,660 | 10/1925 | Cottringer et al. | 23—91 |
| 1,874,735 | 8/1932 | Barstow et al. | 23—91 |
| 2,381,995 | 8/1945 | Belchetz | 23—91 |
| 3,092,450 | 6/1963 | Christensen et al. | 23—91 |
| 3,181,930 | 5/1965 | Olsen | 23—91 |

OSCAR R. VERTIZ, *Primary Examiner.*

EDWARD STERN, *Examiner.*